US011196716B2

United States Patent
Kersting

(10) Patent No.: US 11,196,716 B2
(45) Date of Patent: Dec. 7, 2021

(54) COMPARISON OF COMMUNICATIONS WITH ENCRYPTED LIGHT SIGNALS

(71) Applicant: International Business Machines Corporation, Armonk, NY (US)

(72) Inventor: Nicholas Stephen Kersting, Cross River, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/548,006

(22) Filed: Aug. 22, 2019

(65) Prior Publication Data

US 2019/0379643 A1 Dec. 12, 2019

Related U.S. Application Data

(63) Continuation of application No. 16/008,177, filed on Jun. 14, 2018, now Pat. No. 10,594,667, which is a continuation of application No. 14/924,941, filed on Oct. 28, 2015, now Pat. No. 10,084,758.

(51) Int. Cl.
*H04L 29/06* (2006.01)
*H04B 10/114* (2013.01)
*H04L 9/06* (2006.01)

(52) U.S. Cl.
CPC ........ *H04L 63/0428* (2013.01); *H04B 10/114* (2013.01); *H04L 9/06* (2013.01)

(58) Field of Classification Search
CPC ...... H04L 63/0428; H04L 9/06; H04B 10/114
See application file for complete search history.

(56) References Cited

U.S. PATENT DOCUMENTS

| | | | |
|---|---|---|---|
| 6,400,482 B1 | 6/2002 | Lupton et al. | |
| 7,075,415 B2 | 7/2006 | Levin et al. | |
| 7,720,249 B2 | 5/2010 | Rhoads | |
| 8,005,636 B2 | 8/2011 | Shipton | |
| 8,326,526 B2 | 12/2012 | Won et al. | |
| 8,358,935 B2 | 1/2013 | Choi et al. | |
| 8,971,715 B2 | 3/2015 | Zhang et al. | |
| 2003/0004716 A1 | 1/2003 | Haigh et al. | |
| 2005/0063027 A1 | 3/2005 | Durst | |
| 2010/0304854 A1* | 12/2010 | McEldowney | G06T 5/007 463/30 |
| 2013/0085745 A1 | 4/2013 | Koister et al. | |
| 2013/0121567 A1 | 5/2013 | Hadap | |
| 2014/0056172 A1* | 2/2014 | Lee | H04B 10/1149 370/254 |
| 2014/0093234 A1* | 4/2014 | Roberts | H04B 10/60 398/25 |

(Continued)

OTHER PUBLICATIONS

United States Notice of Allowance dated Jul. 26, 2019 in U.S. Appl. No. 16/008,177.

(Continued)

*Primary Examiner* — Hee K Song
(74) *Attorney, Agent, or Firm* — Peter Edwards, Esq.; McGinn I.P. Law Group, PLLC

(57) ABSTRACT

A method, system, and recording medium for communication comparison including communicating from a first device to a second device by the second device reading frequencies and intensities of light projected, by the first device, on an object.

20 Claims, 6 Drawing Sheets

(56) References Cited

U.S. PATENT DOCUMENTS

| | | |
|---|---|---|
| 2015/0023532 A1 | 1/2015 | Pan |
| 2015/0086213 A1 | 3/2015 | Pederson et al. |
| 2015/0146871 A1 | 5/2015 | Liu et al. |
| 2015/0156186 A1 | 6/2015 | Jeffrey |
| 2016/0012269 A1* | 1/2016 | Kowalczyk ........ G06K 7/10881 235/462.21 |
| 2016/0037290 A1 | 2/2016 | Heywood |
| 2017/0061250 A1 | 3/2017 | Gao et al. |

OTHER PUBLICATIONS

United States Office Action dated Jun. 11, 2019, in U.S. Appl. No. 16/008,177.

United States Office Action dated Jan. 11, 2019, in U.S. Appl. No. 16/008,177.

Mel, et al. "The NIST Definition of Cloud Computing". Recommendations of the National Institute of Standards and Technology, Nov. 16, 2015.

Xie, et al. "Secure semantic expansion based search over encrypted cloud data supporting similarity ranking", Journal of Cloud Computing: Advances, systems and Applications, 3:8, pp. 1-11, 2014 (Year: 2014).

Liu, et al., "Alternating-Signal-Based System Design and Demonstration for Visible Light Communication", Photonics Journal, IEEE vol. 5, No. 4, Article #: 7901806, Aug. 7, 2013, pp. 1-7.

Ebihara, et al.. "Layered Transmission of Space-Time Coded Signals for Image-Sensor-Based Visible Light Communications", Journal of Lightware Technology, IEEE vol. PP, Issue 99, Aug. 19, 2015, pp. 1-14.

United States Notice of Allowance dated May 23, 2018 in U.S. Appl. No. 14/924,941.

United States Office Action dated Dec. 15, 2017 in U.S. Appl. No. 14/924,941.

United Notice of Allowance dated Nov. 4, 2019 in co-pending U.S. Appl. No. 16/008,177.

* cited by examiner

COMPARISON OF COMMUNICATIONS WITH ENCRYPTED LIGHT SIGNALS

CROSS-REFERENCE TO RELATED APPLICATIONS

The present application is a Continuation Application of U.S. patent application Ser. No. 16/008,177, filed on Jun. 14, 2018, which is a Continuation Application of U.S. patent application Ser. No. 14/924,941, filed on Oct. 28, 2015, now U.S. Pat. No. 10,084,758, issued on Sep. 25, 2018, the entire contents of which are hereby incorporated by reference.

BACKGROUND

The present invention relates generally to communication and message comparison with encrypted light signals, and more particularly, but not by way of limitation, to a system, a method, and a recording medium for determining the common semantics of messages by measuring the spectrum of combined light between the messages.

Conventional systems merely read light with a camera and derive information from the observed frequencies. More particularly, such conventional systems read light with a smart phone to open a Uniform Resource Locator (URL).

Other conventional systems permit objects to be 'labelled' with light without detracting from physical appearance and allow assignment of more granular information to individual components of such objects. Such conventional systems demonstrate that the light does not need to be entirely visible to the observer, thus allowing objects to project information in a non-distracting manner, with aims to use this to enhanced advertising, shopping, and museum displays. These conventional systems are designed such that an ordinary camera on a smart device can read the light and open the application to the general public.

However, the above conventional systems, and all other conventional communication and message comparison systems are limited in their application in that they only are directed to one-way communication.

Also, an algorithm has been proposed in a conventional system to convert text to light. However, the conventional algorithm fails to consider user-to-user communication and message comparison after converting text to light.

That is, there is a technical problem in the conventional systems that the methods of reading light using a device are only directed to a read-function and do not consider user-to-user communication with an output, read, and comparison function. Also, the conventions systems do not consider projection of light based on a user-input message from the users device.

SUMMARY

In an exemplary embodiment, the present invention can provide a method for communication and communication comparison, the method including encrypting a first communication and a second communication, determining a list of frequencies and intensities based on the first communication and the second communication, projecting light based on the list of frequencies and intensities of the first communication onto an object, reading the frequencies and intensities of the light based on the first communication from the object, and comparing the light read in the reading with the list of frequencies and intensities of the second communication to calculate a semantic overlap between the frequencies and intensities of the first communication and the second communication.

Further, in another exemplary embodiment, the present invention can provide a system for communication and communication comparison, the system including an encryption device configured to encrypt a first communication and a second communication, a light frequency determination device configured to determine a list of frequencies and intensities based on the first communication and the second communication, a light projection device configured to project light based on the list of frequencies and intensities of the first communication onto an object, a light reading device configured to read the frequencies and intensities of the light based on the first communication from the object, and a light comparison device configured to compare the light read in the reading with the list of frequencies and intensities of the second communication to calculate a semantic overlap between the frequencies and intensities of the first communication and the second communication.

Even further, in another exemplary embodiment, the present invention can provide a non-transitory computer-readable recording medium recording a communication and communication comparison program, the program causing a computer to perform: encrypting a first communication and a second communication, determining a list of frequencies and intensities based on the first communication and the second communication, projecting light based on the list of frequencies and intensities of the first communication onto an object, reading the frequencies and intensities of the light based on the first communication from the object, and comparing the light read in the reading with the list of frequencies and intensities of the second communication to calculate a semantic overlap between the frequencies and intensities of the first communication and the second communication.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
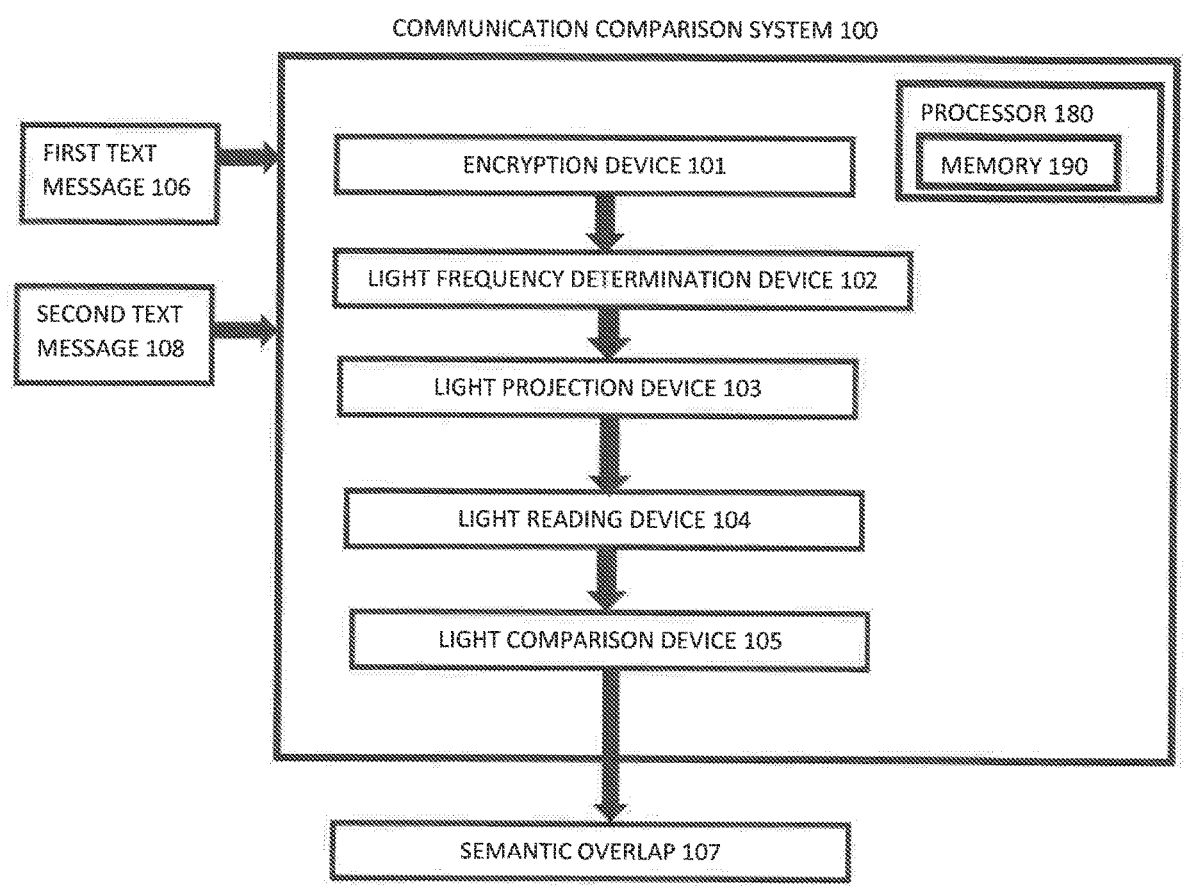
FIG. 1 exemplarily shows a block diagram illustrating a configuration of a communication comparison system 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the communication and message comparison system 100 includes an encryption device 101, a light frequency determination device 102, a light projection device 103, a light reading device 104, and a light comparison device 105. The communication and message comparison system 100 includes a processor 180 and a memory 190, with the memory 190 storing instructions to cause the processor 180 to execute each device of the communication and message comparison system 100.

Although as shown in FIG(s). 4-6 and as described later, the computer system/server 12 is exemplarily shown in cloud computing node 10 as a general-purpose computing device which may execute in a layer the communication and message comparison system 100 (FIG. 6), it is noted that the present invention can be implemented outside of the cloud environment.

The communication and message comparison system 100 receives a first text message 106 from a first device 1 and a second text message 108 from a second device 2. The text message can include any message that a first user of the first device 1 would like to convey to a second user of a second device 2 (or a plurality of users), for example, the first users thoughts and feelings about an event, what the first user would like to do that day, how the user feels about a particular person, etc.

It should be noted that the communication and message comparison system 100 can also receive an emotion through a users heart rate, body temperature, a voice message, a pressure applied to the device, an image input, etc. That is, the input to the communication and message comparison system 100 is not limited to a text message. Any measurable emotion or data can be input into the communication and message comparison system 100. For example, if a user is at a horror show, the users heart rate can be input into the first device 1 by a conventional heart rate reading mechanism such that the users heart rate can be analyzed as compared to a second users heart rate input into the second device 2.

Although the exemplary embodiment described herein is directed towards a single user entering a first text message 106 and projecting the light onto an object 3 and a single user entering a second text message 108 and reading the light to compare with the first text message 106, the disclosure is not limited to a single user-to-a single user communication. That is, a plurality of users can each input into their individual devices a first text message 106 and output the light onto the object 3 so as to create a collection of light projected on the object 3 for the plurality of users. In this manner, a plurality of other users can read the light from the object 3 and compare it based on their own message input into their individual device.

The encryption device 101 receives the first text message 106 and converts the first text message 106 into raw coded light. The encryption can be done, for example, by converting raw messages to coded light by using hashes words of English text to sets of integers with WordNet™ which has the desirable property that a size of intersection of two-words sets is proportional to the words semantic similarity (e.g., "espresso" is hashed to a set {a,b,c} and "cappuccino" is hashed to a set {a,d,e}). The sets have a non-zero intersection, 'a', because, both being forms of coffee, they are semantically related.

An unrelated word hashes to a disjoint set. For example, "later" is hashed to a set {f,g,h}, because it is semantically unrelated to coffee. The encryption device 101 can be used with dictionaries customized to specialized applications, and that further adds an additional layer of security against uninvited matching.

The encryption device 101 combines the set elements. For example, the encryption device 101 combines the text messages "espresso" and "later" to a coded light signal by concatenating the sets: {a,b,c,f,g,h}. This exemplary method of combining used by the encryption device 101 is called "S_1" and interprets the individual set elements as light frequencies.

Another message "cappuccino" and "later" can be represented by the set {a,d,e,f,g,h} and these two sets overlap (in the element "a").

The encryption device 101 can use a more secure level of encryption, "S_2", which sums all pairs of integers from distinct sets. Thus, the encryption of "espresso" and "later" is:

"{$a+f$, $a+g$, $a+h$, $b+f$, $b+g$, $b+h$, $c+f$, $c+g$, $c+h$} (={[espresso+later]}"

In other words, all integers from "espresso" are added to all integers from "later" by the encryption device 101 using the second encryption method.

The encryption of "cappuccino", "espresso", and "later" would be

"{[espresso+later], [espresso+cappuccino], [later+cappuccino]}"

Thus, "espresso later" and "cappuccino espresso later" agree in at least the elements represented by [espresso+later].

It should be noted that the encryption techniques of the encryption device 101 do not depend on any one particular encryption scheme, but the fact that some schemes already exist and can only improve in the future adds strength to the feasibility of implementing the disclosed invention. Thus, the above two examples are not intended to limit the invention and are merely for exemplary purposes of potential encryption techniques by the encryption device 101.

The encryption device 101 outputs the encrypted text message to the light frequency determination device 102.

The light frequency determination device 102 determines a frequency and intensity of light which corresponds to the encrypted text message.

The light projection device 103 projects light onto an object 3 at the determined frequency and intensity of light corresponding to the encrypted text message. The projection of light with frequencies and intensities corresponding to the encrypted message is not restricted to laser or Light Emitting Diode (LED) lights only. The crudest implementation could simply use colored light bulbs, for example, or natural colors of existing objects could be used to reverse-design the algorithm converting message semantics to frequency.

It should be noted that the object 3, which the light is projected on, can be, for example, a physically-separate object, an object on the first user (e.g. a garment or badge), etc. That is, the object 3 is not limited to any particular object 3 as long as the light can be read by the light reading device 104. The object 3 can include a surface which is pre-colored to reflect a fixed combination of frequencies and intensities of light.

Also, the light projection device 103 can include a processor which processes or filters the light before reflection or re-emitting.

Further, the light projection device 103 can project light such that the projection is time-dependent In this manner, the light pulses at different times to convey different parts of the first text message 106. Thus, the projection device 103 can add information to the projected light at varying times or display different parts of the encrypted message at a plurality of times. Also, the projection device 103 can project a first part of the first text message at a first time and a second part of the first text message at a second time based on a user input of when to project each message.

Further, when a plurality of users project light onto the object 3 at the determined frequency and intensity of light corresponding to each of the plurality of users' individual encrypted text messages, more highly-shared frequencies will naturally dominate over less-shared frequencies in the light reflected from the object 3. For example, if one-hundred users input a message that starts with "Let's meet on Monday to . . . " which is projected as bright red light, the combination of one-hundred projections of the bright red light will dominate the light being reflected by the object 3. Also, since the end of the message "Let's meet on Monday to . . . " varies for each user and the frequency of light projected will be different from each user, the weaker signals will not be as visible as the stronger signal of the bright red light. Thus, anyone who also wants to meet on Monday can read the light and easily detect the important part of the message that a meeting will occur on Monday.

In other words, the more users that output a similar light frequency on the object 3, the better those similar light frequencies are reflected from the object 3.

The light reading device 104 captures and reads the light projected on the object 3 by the light projection device 103.

The light comparison device 105 compares the light that has been read by the light reading device 104 to the second text message 108 for a similarity (or similarities) between the first text message 106 and the second text message 108. Such a similarity (or similarities will be made) will be made on the basis of the light frequencies and intensities associated with each of the first text message 106 and the second text message 108.

In other words, the projected light by the light projection device 103 is read by the light reading device 104 of the second device 2, and is compared to the encrypted second text message 108 to determine a frequency and an intensity overlap (i.e., a semantic overlap 107).

After the light frequencies between the first text message 106 and the second text message 108 are compared by the light comparison device 105, the light comparison device 105 outputs the semantic overlap 107 between the first text message 106 and the second text message 108 to a display monitor 23 of the second device. The semantic overlap 107 may be indicated by a number of similarity measures that yield a score between 0 (no similarity) and 1 (full similarity), converted to a percentage similarity by multiplying by 100. For example, "best overlap" is the number of shared frequencies divided by the total number of frequencies in the smaller message, "Jacard similarity" is the number of shared frequencies divided by the total number of frequencies in the both messages, and "Dice similarity" is the number of shared frequencies divided by the average number of frequencies in the both messages.

Thus, the greater the percentage output to the display monitor 23, the greater the semantic overlap 107 between the first text message 106 and the second text message 108.

According to the semantic overlap 107, the second user can determine a semantic agreement with the first user and decide what steps to take based on the semantic overlap 107. For example, if the semantic overlap 107 output to the display monitor 23 of the second device 2 is relatively high (e.g., 95%), then it is likely that the user of the second device 2 would approach the user of the first device 1 to develop a relationship. However, if the semantic overlap 107 output to the display monitor 23 of the second device 2 is relatively low (e.g., 5%), then it is likely that the user of the second device 2 would not approach the user of the first device 1 to develop a relationship.

Figure 2:
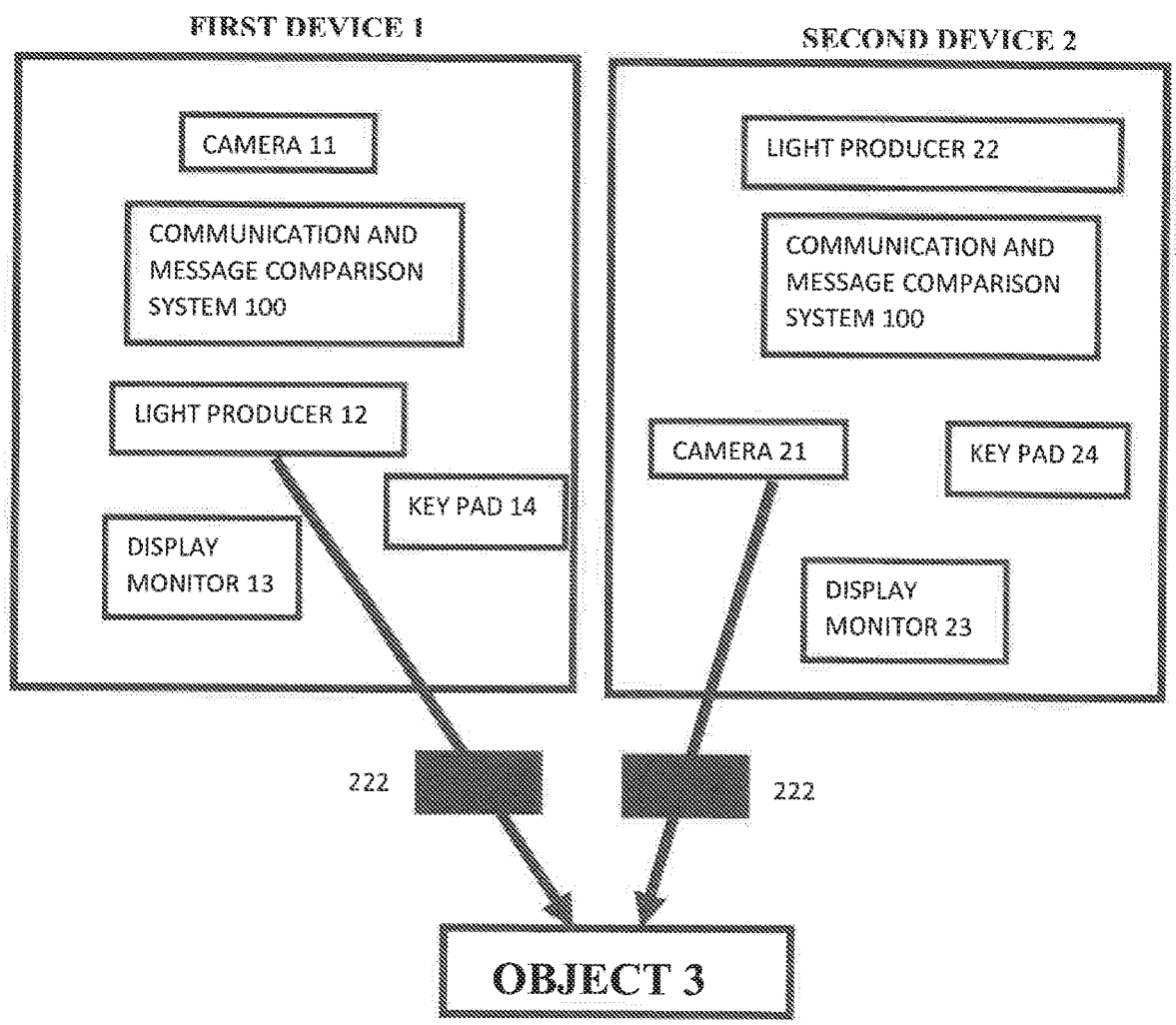
FIG. 2 exemplarily shows a block diagram illustrating a configuration of a first device 1 and a second device 2 using the communication comparison system 100.

FIG. 2 exemplarily shows a configuration of the first device 1 and the second device 2 having the communication and message comparison system 100 installed therein to project light on object 3 and receive the light projected from object 3.

As shown in FIG. 2, the user of the first device 1 enters the text message 106 into the communication and message comparison system 100 via an input device (e.g., a key pad 14). The light producer 12 of the first device 1 (i.e., the light projection device 103) projects the light onto object 3.

As shown, prisms 222 or other optical filters can be positioned between the light producer 12 and the object 3 so as to manipulate the output.

The second user of the second device 2 enters a second text message 108 into the communication and message comparison system 100 via an input device (e.g., a key pad 24) and points/aims the camera 21 of the second device 2 (i.e., the light reading device 104) at the object 3 to read the light projected from the first device 1.

The light comparison device 105 of the communication and message comparison system 100 installed in the second device 2 compares the received light from the first device 1 with the encrypted light of the second text message 108 entered by the second user.

Based on the comparison made by the light comparison device 105 of the communication and message comparison system 100 of the second device 2, the second device 2 outputs via the display monitor 23 the semantic overlap 107 between the first text message 106 and the second text message 108.

As can be seen from FIG. 2, the first device 1 and the second device 2 both may have identical (or similar) components such that each device can receive or emit light via the camera and light producer of each device.

Thus, the communication and message comparison device 100 can be installed on any device that has the capability to project and read light. In this manner, the disclosed invention is applicable to multiple devices on the current market and adaptable to be installed into future devices. That is, the first device 1 and second device 2 can include any cellphone, Personal Digital Assistant (PDA), mobile terminal), tablet, computer, any future device, etc.

Figure 3:
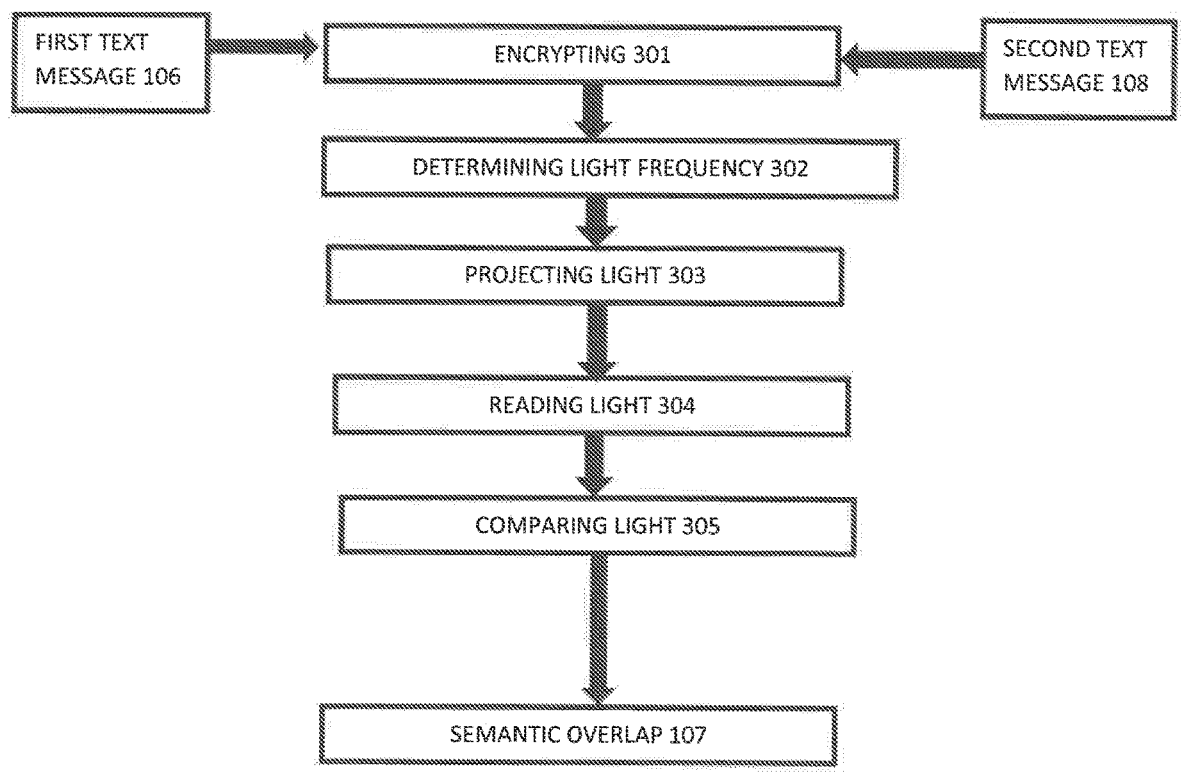
FIG. 3 exemplarily shows a high level flow chart for a communication comparison method 300.

FIG. 3 shows a high level flow chart for a communication and message comparison method 300 that receives a first text message 106 and a second text message 108 as inputs.

Step 301 encrypts the first text message 106 and the second text message 108 into raw coded light. The encrypting encrypts the first text message 106 and second text message 108 to be converted to light according to a predetermined map to sets of integers.

Step 302 determines a light frequency associated with each raw coded light.

Step 303 projects the light frequency determined in step 302 onto an object 3. The projecting can include an automated iterative process.

Step 304 reads the light projected on the object 3.

Step 305 compares the light received in step 304 with the raw coded light of the second text message 108.

Step 305 further outputs a semantic overlap 107 based on a comparison between the raw coded light of the second text message 108 and the received light from step 304.

In view of the foregoing and other problems, disadvantages, and drawbacks of the aforementioned background art, it is desirable to provide a new and improved communication and message comparison with an encrypted light signal system which enables user-user social communication using light frequencies.

An exemplary aspect of the disclosed invention provides a system, method, and non-transitory recording medium for a users device to convert a users message to light and to project the light onto an object such that other users measure the reflected light with their own device and determine a semantic overlap with their own message. Thus, the disclosed invention can provide a technical solution to the technical problem in the conventional approaches by allowing user-to-user communication using light to calculate a semantic overlap between the plurality of users messages.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
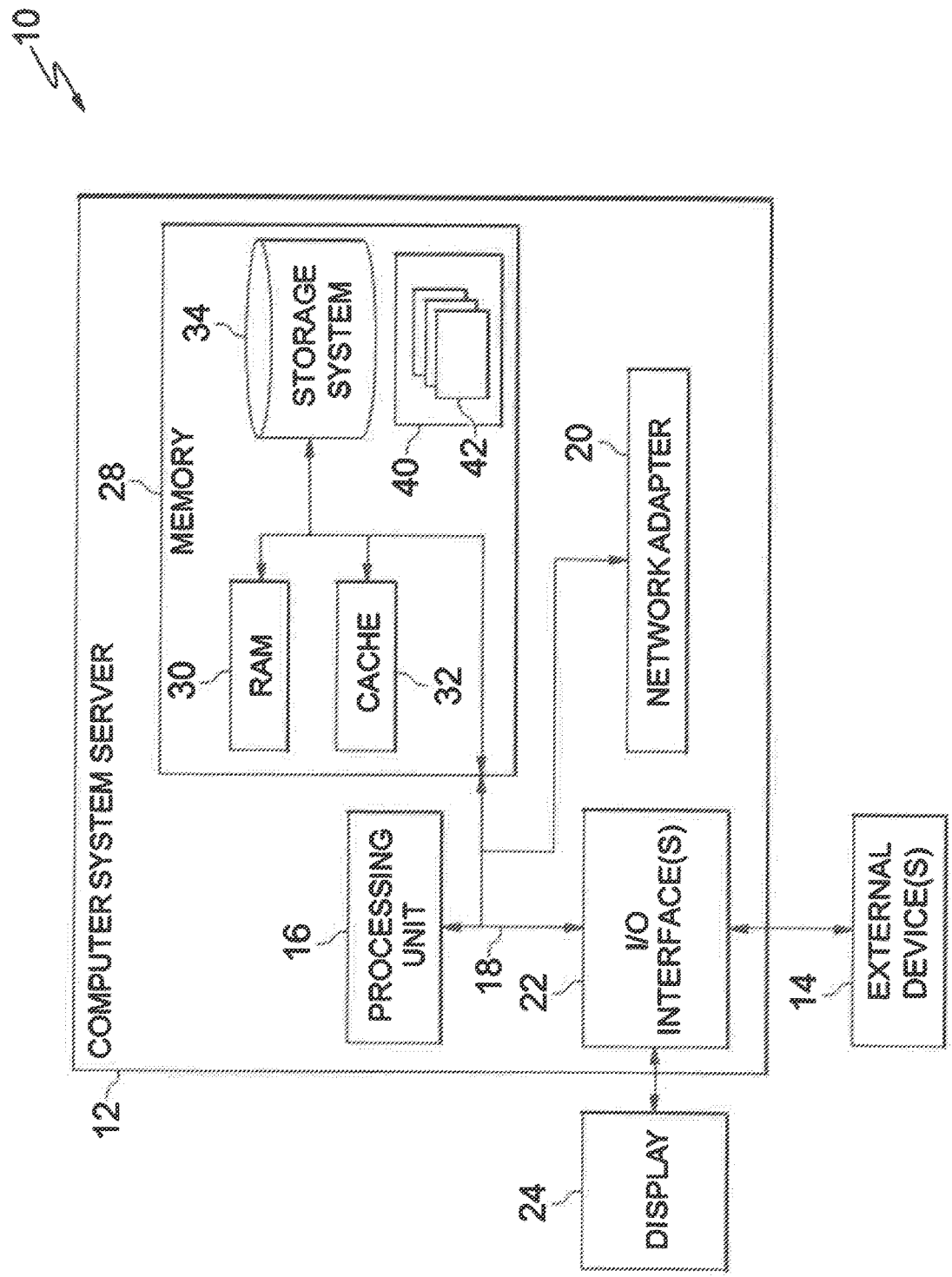
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
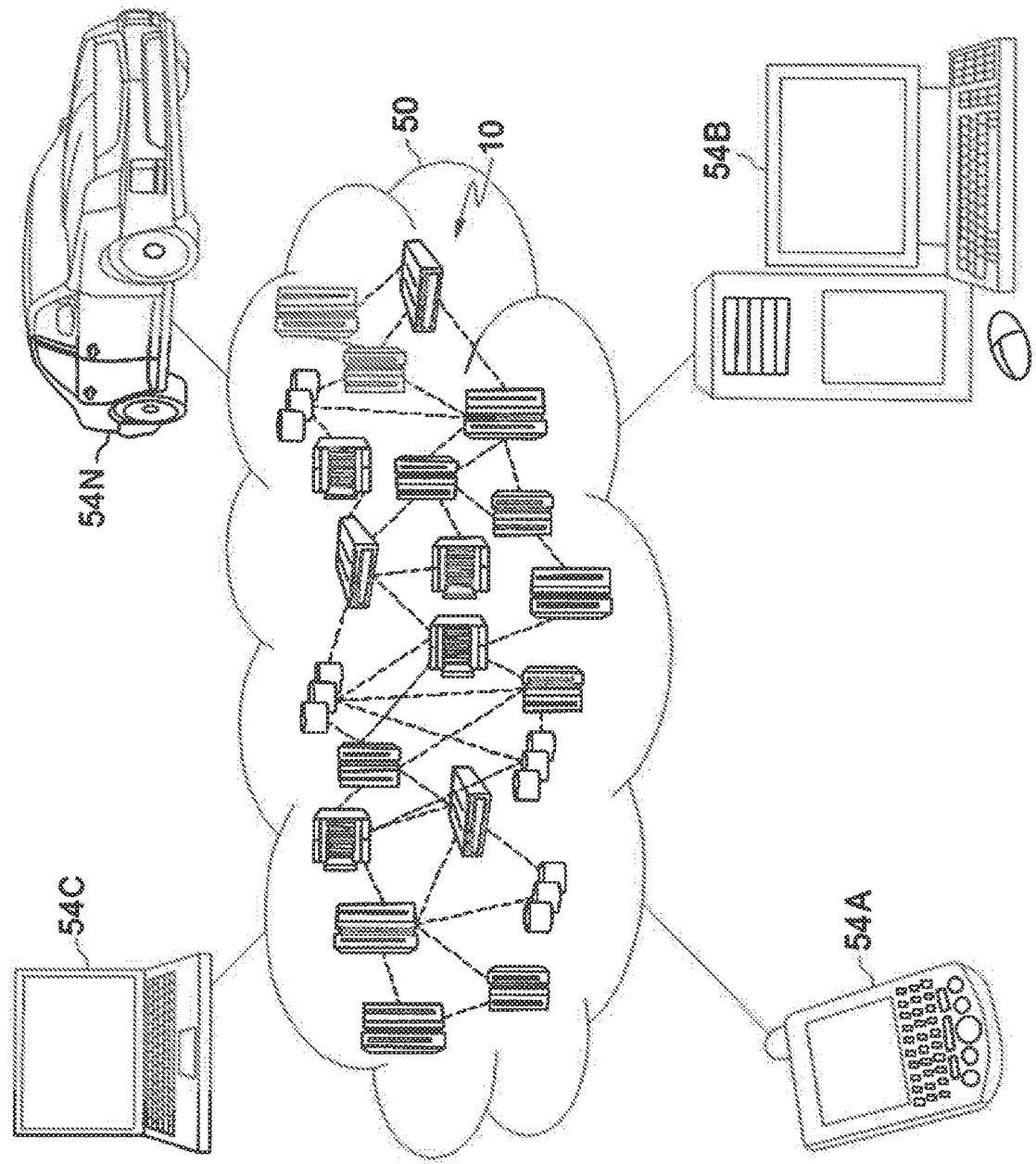
FIG. 5 depicts a cloud computing environment according to another embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 6:
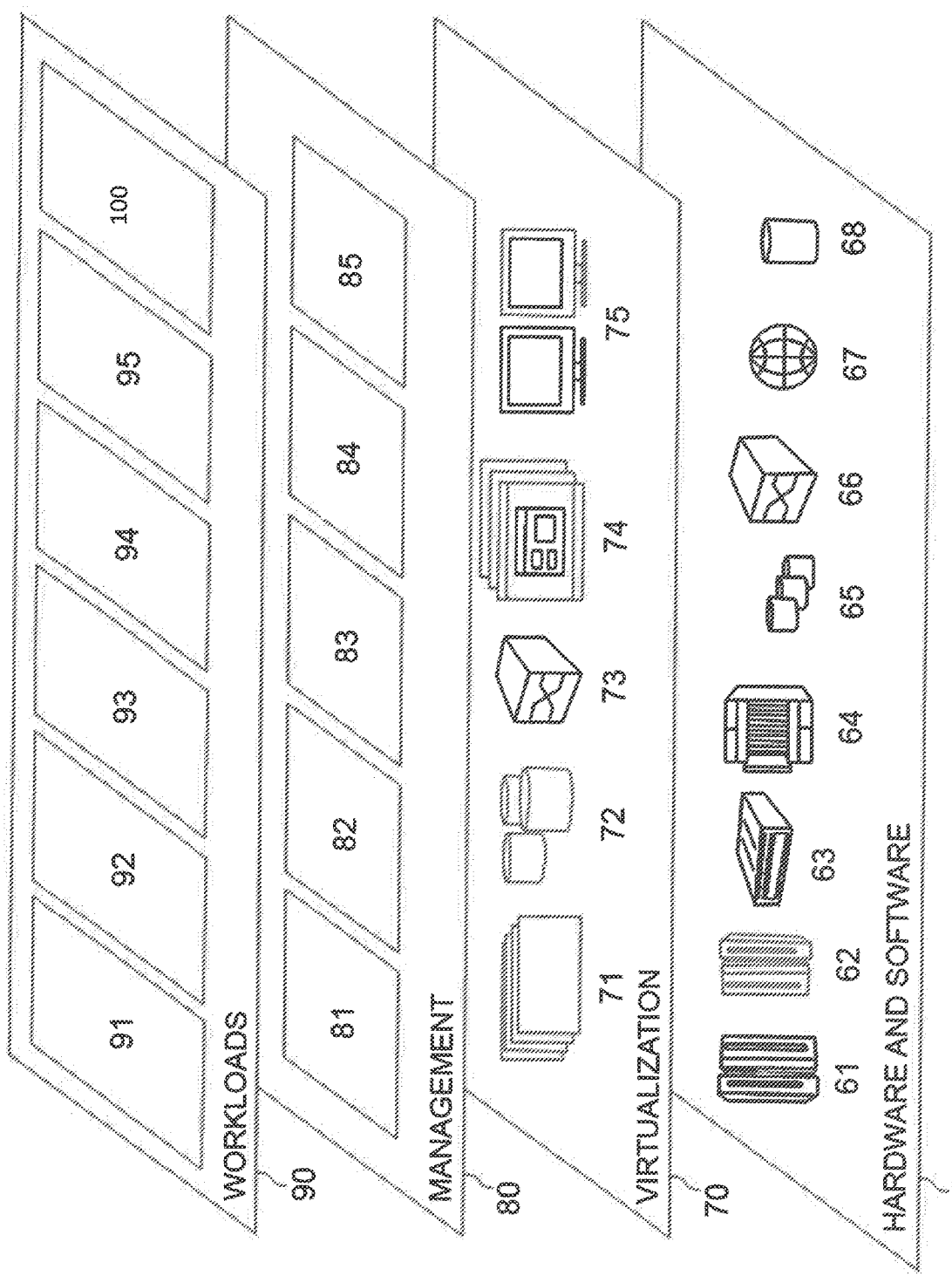
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the communication and message comparison 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method for communication comparison, the method comprising:
communicating between a first device and a second device by the second device dynamically reading frequencies and intensities of light projected by the first device on an object; and
determining a semantic agreement based on a result of the reading.

2. The method of claim 1, wherein frequencies and intensities of light projected by the first device are encrypted using a conversion algorithm using a bit-wise conversion based on each frequency received.

3. The method of claim 1, wherein frequencies and intensities of light projected by the first device are encrypted using a conversion algorithm using a set-wise such that each word of a first communication from the first device activates several frequencies with one unit of intensity each.

4. The method of claim 1, wherein the communicating is time-dependent.

5. The method of claim 1, wherein the communicating between the first device and the second device is time-dependent so as to add information to the projected frequencies and intensities of light at varying times.

6. The method of claim 1, wherein the object reflects the light onto a second object.

7. The method of claim 1, wherein prisms are disposed in a path of the light in front of the object.

8. The method of claim 1, wherein the frequencies and intensities of light are projected via an automated iterative process.

9. The method of claim 1, wherein the object comprises a surface which is pre-colored to reflect a fixed combination of frequencies.

10. The method of claim 1, wherein the first device comprises a first type of device, and
wherein the second device comprises a second type of device.

11. The method of claim 1, wherein the frequencies and intensities of light projected by the first device on the object are time-dependent.

12. The method of claim 11, wherein information is added to the frequencies and intensities at varying times.

13. The method of claim 1, wherein the semantic agreement is related to an overlap of similar intent between a communication of the first device and the second device.

14. The method of claim 13, wherein the semantic agreement is determined by converting the light projected by the first device into coded light using hashes of words to sets of integers which has a property that a size of an intersection of two-word sets is proportional to the words have the semantic similarity.

15. The method of claim 1, wherein the semantic agreement is determined by converting the light projected by the first device into coded light using hashes of words to sets of integers which has a property that a size of an intersection of two-word sets is proportional to the words have the semantic similarity.

16. A system for communication comparison, the system comprising:
a processor; and
a memory, the memory storing instructions to cause the processor to perform:
communicating between a first device and a second device by the second device dynamically reading frequencies and intensities of light projected by the first device on an object; and
determining a semantic agreement based on a result of the reading.

17. The system for communication comparison of claim 16, wherein the semantic agreement is related to an overlap of similar intent between a communication of the first device and the second device.

18. A non-transitory computer-readable recording medium recording a communication comparison program, the program causing a computer to perform:
   communicating between a first device and a second device by the second device dynamically reading frequencies and intensities of light projected by the first device on an object; and
   determining a semantic agreement based on a result of the reading.

19. The non-transitory computer-readable recording medium of claim 18, wherein the semantic agreement is related to an overlap of similar intent between a communication of the first device and the second device.

20. The non-transitory computer-readable recording medium of claim 18, wherein the semantic agreement is determined by converting the light projected by the first device into coded light using hashes of words to sets of integers which has a property that a size of an intersection of two-word sets is proportional to the words have the semantic similarity.

* * * * *